Aug. 13, 1929.     H. B. BROWN     1,724,822
PIPE COUPLING AND ANALOGOUS UNION
Filed Dec. 8, 1927
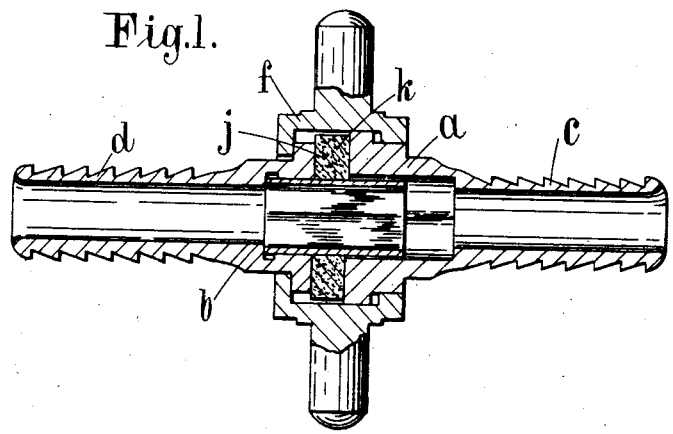
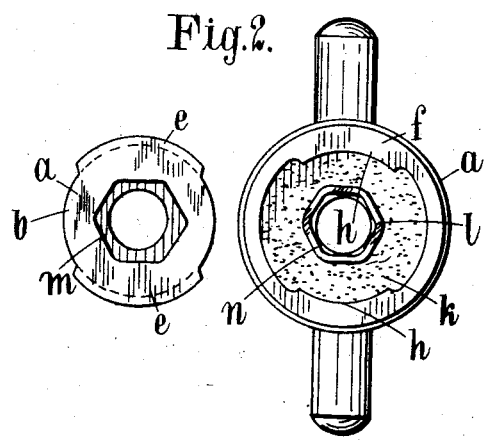
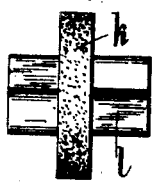
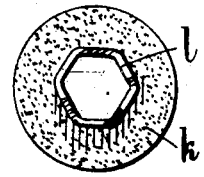
Henry Barnett Brown
INVENTOR
ATTORNEYS Patented Aug. 13, 1929.

1,724,822

UNITED STATES PATENT OFFICE.

HENRY BARNETT BROWN, OF LONDON, ENGLAND, ASSIGNOR TO THE "SIMCUP" COMPANY LIMITED, OF LONDON, ENGLAND.

PIPE COUPLING AND ANALOGOUS UNION.

Application filed December 8, 1927, Serial No. 238,652, and in Great Britain July 21, 1927.

This invention relates to couplings for hose, taps, pipes and the like, and also unions for radiator-caps, tank-caps and the like, known as spigot and socket joints, that is, in which one part or half of the coupling or union is attached to the other half by producing first an axial and then a rotary movement of the first part, a washer being provided in the coupling and between the two parts.

The object of this invention is to provide an improved construction of coupling whereof it is practically impossible for it to become uncoupled by accident.

To this end, the resilient washer is mounted on a ferrule or tube which has a cross-section of a plurality of straight sides, said tube fitting into correspondingly shaped recesses formed in the spigot and socket portions.

The invention will now be described with reference to the accompanying drawings in which Figure 1 is a sectional elevation of one form of coupling constructed in accordance with this invention, Figure 2 is an end elevation of the spigot and socket portions, Figure 3 is a side elevation of the washer mounted on the tube, and Figure 4 is an end view thereof.

The invention is here illustrated as a coupling for connecting together two lengths of piping or hose.

The coupling consists of a socket portion $a$ and a spigot portion $b$, each portion being formed with a ribbed extension $c$, $d$, respectively to be fitted into a flexible pipe or length of hose.

The spigot portion $b$ is formed with two oppositely disposed lugs $e$, $e$ on the exterior surface thereof.

The socket portion $a$ is formed in two parts, a flanged union $f$ and a flanged tubular part whose extremity $c$ is ribbed.

The union $f$ is formed with two oppositely opposed lugs $h$, $h$ on the interior surface which are adapted to be passed between and behind the lugs $e$, $e$ when the union is moved axially of the spigot $b$ and rotated thereon.

Disposed inside the socket portion and abutting against the shoulder $j$ is a washer consisting of a ring $k$ of india rubber or other suitable material mounted on the short piece of metal tubing $l$ which is hexagonal in cross-section.

The tube $l$ fits into correspondingly shaped recesses $m$, $n$ in the spigot and socket portions.

The diameter of the india rubber or like ring $k$ when mounted on the tube $l$ is preferably slightly less than the internal diameter of the socket.

Instead of making the tube with six surfaces, it may have any number above two.

With a coupling or union constructed in accordance with this invention, there is no torsional strain put upon the flanged union $f$, any such strain due to a twist or kink in the pipe or hose is taken up by the tube $l$ and rotation thereof in the spigot and socket portions cannot take place.

What I claim is:—

A pipe coupling comprising spigot and socket portions, the spigot portion having two diametrally opposed circumferential projections, said portions being further provided with a multi-sided depression, a removable metal tube shaped like the depression and adapted to closely fit therein to prevent rotation of one portion relative to the other, a resilient washer mounted around said tube at an intermediate portion thereof, a union member mounted over the socket portion and having an aperture formed on one face thereof corresponding to the shape of the spigot portion, and a pair of opposed projecting members at the periphery of the union, said union being adapted to secure the two portions in closely related position by first fitting the spigot portion inside the corresponding aperture of the union and turning the latter one-quarter turn.

In testimony whereof he affixes his signature.

HENRY BARNETT BROWN.